March 27, 1934.  B. GOLDMAN  1,952,127
HYDRAULIC JACK
Filed Oct. 13, 1928   3 Sheets-Sheet 1
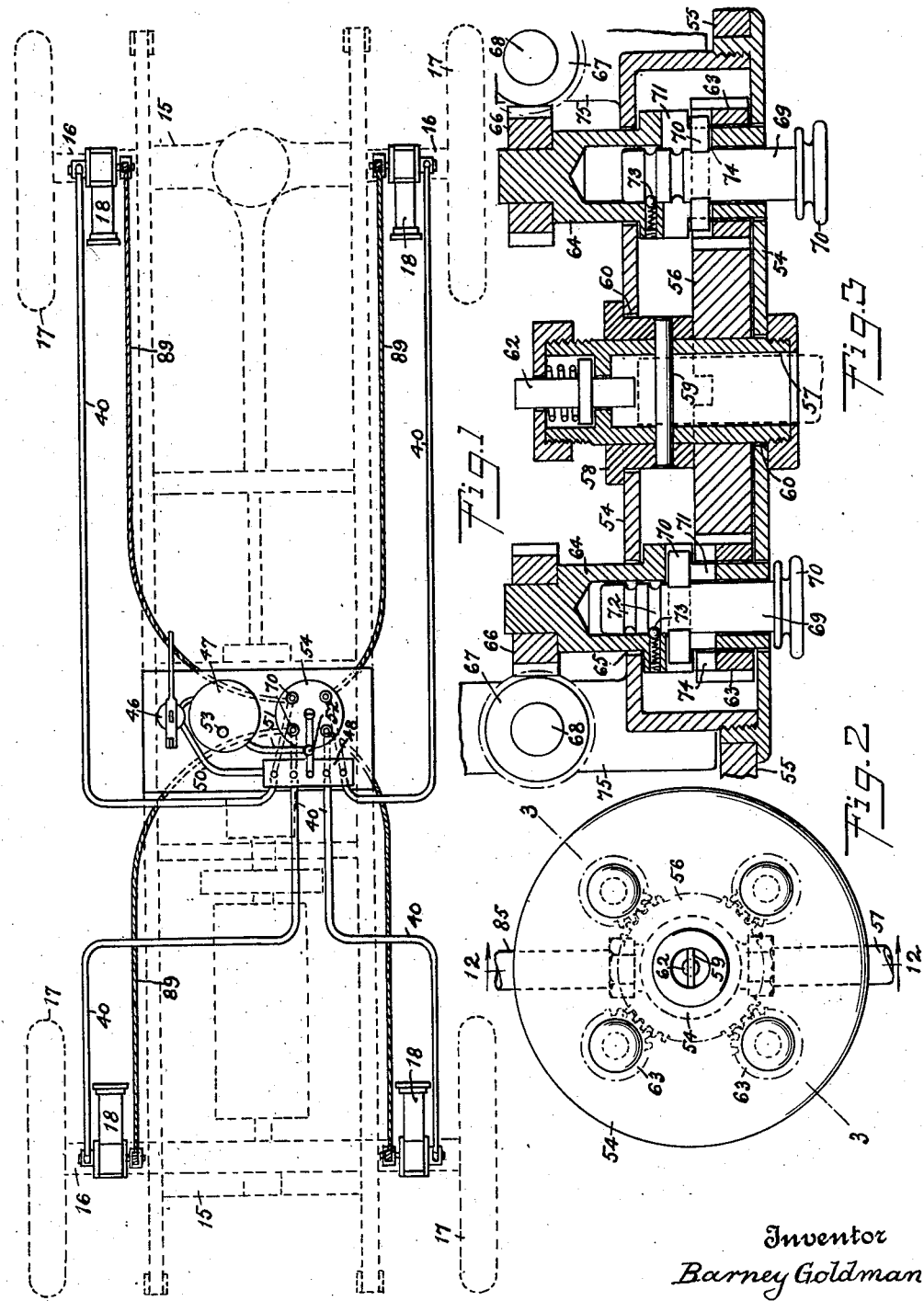
Inventor
Barney Goldman
By his Attorney John A Bergstrom March 27, 1934.  B. GOLDMAN  1,952,127
HYDRAULIC JACK
Filed Oct. 13, 1928  3 Sheets-Sheet 2
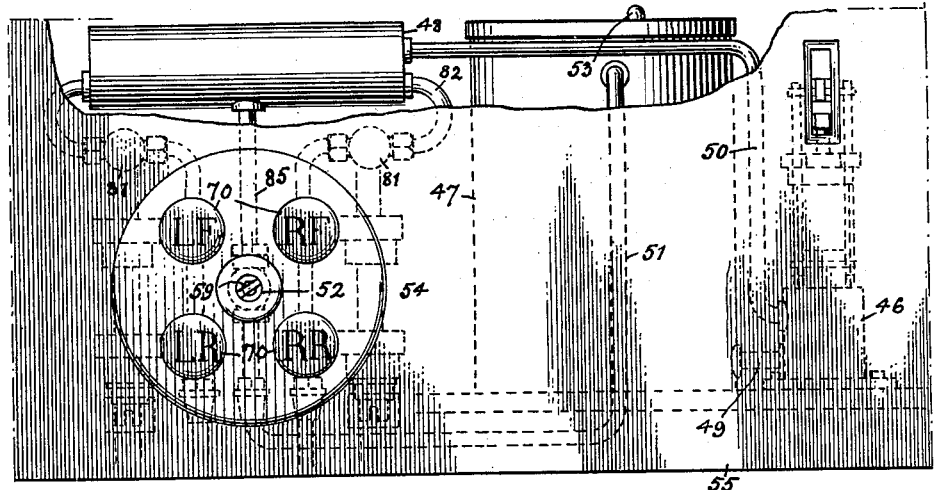
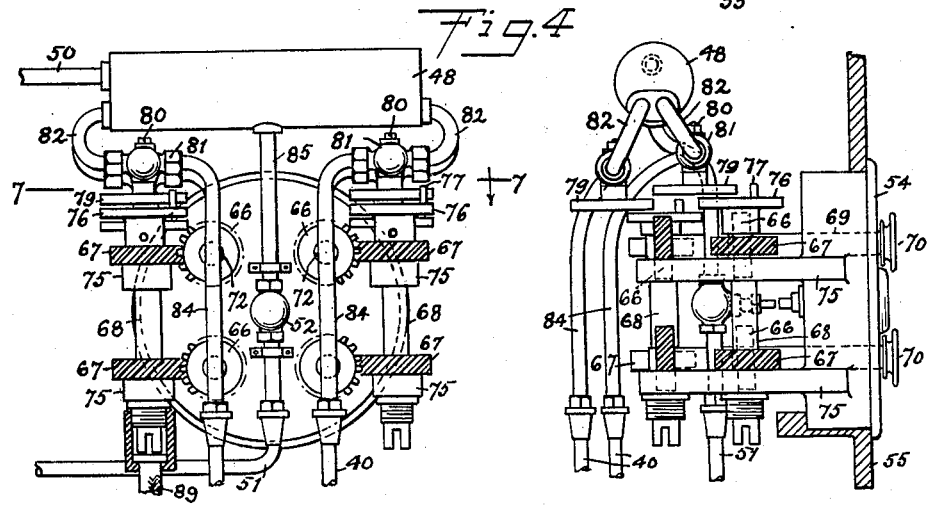
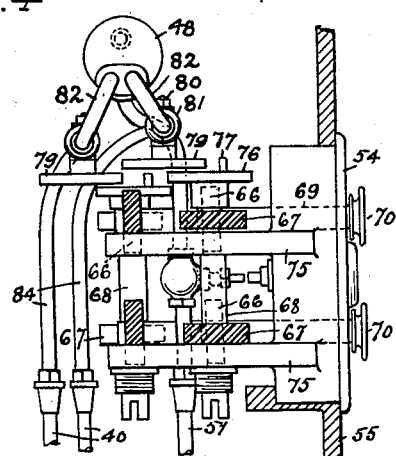
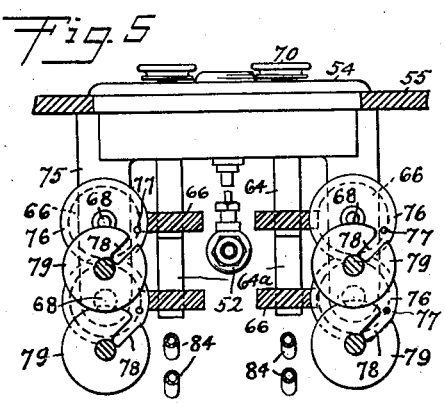
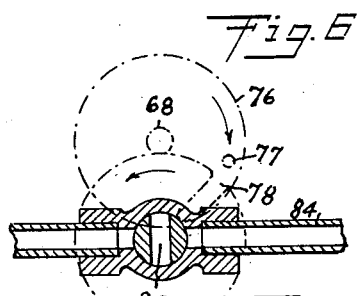
Inventor
Barney Goldman
By his Attorney John A. Bergstrom

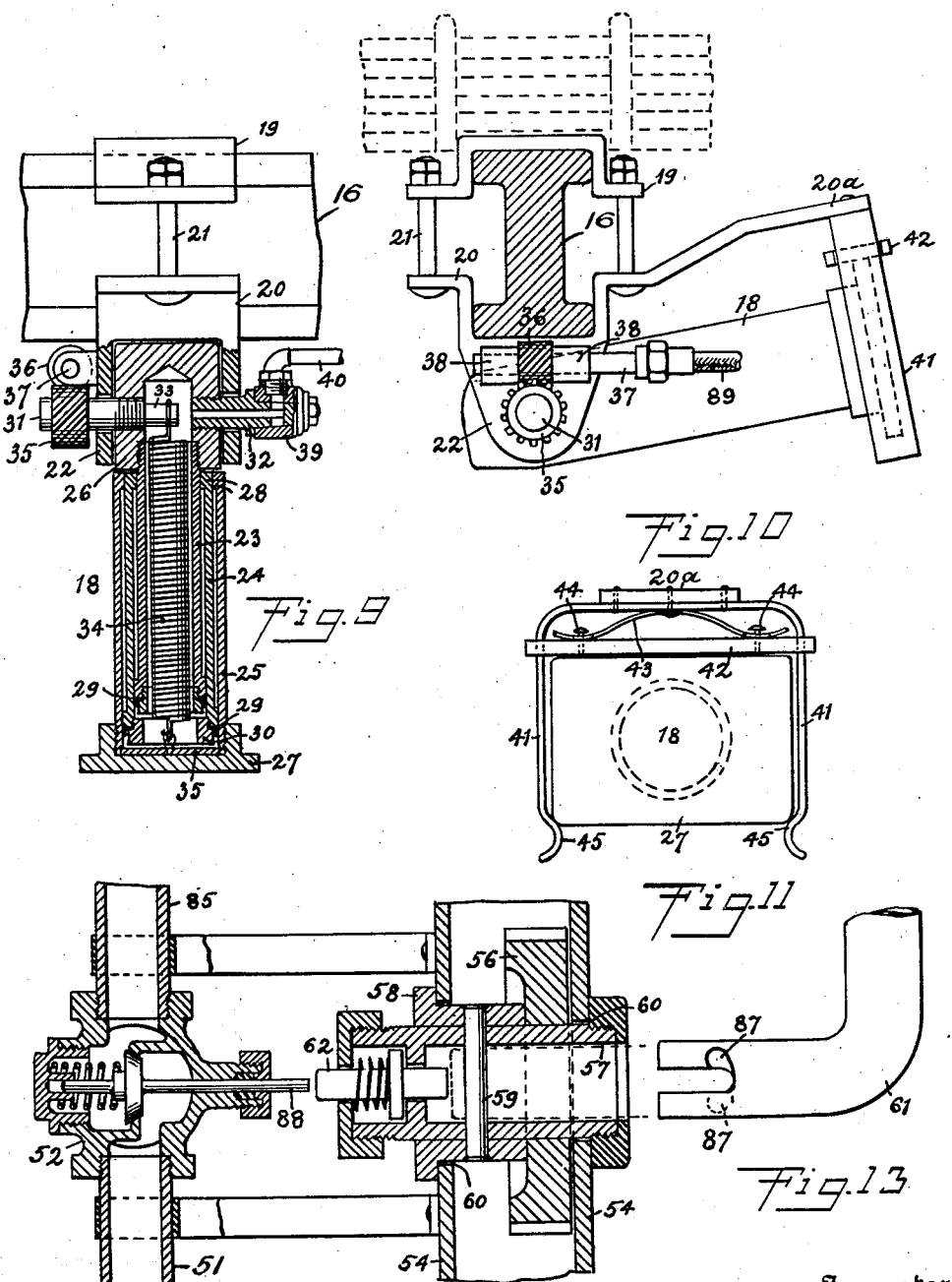

Patented Mar. 27, 1934

1,952,127

UNITED STATES PATENT OFFICE 1,952,127

HYDRAULIC JACK

Barney Goldman, New York, N. Y.

Application October 13, 1928, Serial No. 312,246

3 Claims. (Cl. 254—86)

This invention relates to fluid operated lifting jacks for motor vehicles, which are permanently secured to, and carried by the vehicle, and comprehends devices controlled and within reach of the operator while seated behind the steering wheel of the car, whereby the entire vehicle or any selected wheel thereof may be raised clear off the ground.

An object of the invention is to provide a device for the selection of any of the jacks, to elevate a certain wheel or wheels, also a driving gear mechanism whereby the selected jack may be easily moved into an out of the way position, when not in use and will not interfere with the operation of the automobile or present an unsightly appearance.

Another object of the invention is to provide a locking and cushioning device for the jacks while the car is travelling on the road, thereby keeping them from rattling.

Another object of the invention is to provide a suitable hand-operated pump for the purpose of forcing liquid, stored in a tank, into the selected jack or jacks.

And still another object of the invention is to provide means whereby when the selected jack is moved into or out of its operative position, it will automatically open or close the valve in the feed pipe leading thereto.

With the above and other objects in view, the invention consists in the details of construction and arrangement of parts to be hereinafter more fully described and claimed and illustrated in the accompanying drawings in which similar numerals of reference designate corresponding parts throughout the several views in which:—

Fig. 1 represents a plan view of an automobile shown in dotted lines with the invention shown diagrammatically in full lines.

Fig. 2 is a face view of the selecting and operating device.

Fig. 3 is a horizontal cross-section, on an enlarged scale, on line 3—3 of Fig. 2.

Fig. 4 is a vertical face view of a portion of the instrument board of an automobile partly broken away showing the arrangement of the pump, storage tank, manifold and connections in dotted lines.

Fig. 5 is a vertical rear elevation of the selecting mechanism.

Fig. 6 is a vertical side elevation of the selecting mechanism.

Fig. 7 is a horizontal section on line 7—7 of Fig. 5.

Fig. 8 is a horizontal section, on an enlarged scale, through one of the valves, showing its operation diagrammatically.

Fig. 9 is a vertical section of the jack, contracted, attached to the axle of an automobile.

Fig. 10 is a side elevation of the jack in an inoperative position.

Fig. 11 is an end view of the locking device.

Fig. 12 is a cross-section, on an enlarged scale, on line 12—12 of Fig. 2, showing the operation of the relief valve, and Fig. 13 is a fragmentary side elevation of the operating key.

In the drawings the numeral 15 designates the chassis of an automobile, having front and rear axles 16, provided with wheels 17. The telescopic hydraulic jack 18 is fastened to the axle 16 by clamps 19 and 20 which straddle the axle and are held together by bolts 21. The lower clamp 20 has downwardly projecting lugs 22, into which the jack 18 is swingingly mounted.

The jack 18 is composed of three tubular sections 23, 24 and 25. The inner section 23 is screwed into a head 26 and the outer section into a base plate 27. Each section at its extreme end has an annular shoulder 28 which prevents them from pulling apart. At the lower end of the two inner tubular sections are fastened hydraulic packing rings 29 which are held in position by nuts 30.

The head 26, at opposite sides thereof is equipped with trunnions 31 and 32 onto which the jack is mounted to swing. Trunnion 31 is made solid with a small teat 33, projecting into the head for the purpose of fastening the upper end of the spring 34. The lower end of said spring is fastened to a small disc 35 which is held in position in a recess at the lower end of the tubular section 25. At the outer end of the trunnion 31 is fastened a gear wheel 35 which meshes into a worm wheel 36, mounted on a shaft 37, made to revolve in bearings 38, fastened to one of the lugs 22 of the bracket 20. Trunnion 32 is made hollow and at its outer end is connected to a swing joint 39. The object of this is, when the jack swings up or down, it will not disturb the location of the feed pipe 40.

By referring to Fig. 10, it will be seen that the clamp 20 has an outward extended portion 20a. To the extreme end thereof is fastened a spring 41 forming an inverted U. At the upper portion thereof is a follower 42 slidingly mounted thereon. Interposed between the spring 41 and the follower 42 is a spring 43 which is riveted in the centre to clamp 20a. The spring 43 is loosely fastened to the follower by pins 44.

The lower ends of the spring 41 are turned outward and then inward, forming an offset 45. The object of this is, that when the base of the jack is pushed up between the ends of said spring they will spread and allow the upper end of the base 27 to come in contact with the follower 42 and when forced up until the inturned portion 45 of the spring 41 comes in contact with the lower corners of the base plate 27, will hold same in position.

The controlling device for operating the jack consists of a hand-pump 46, storage tank 47 and manifold 48. The pump 46 is connected to the storage tank 47 by a suction pipe 49 and to the manifold 48 by a discharge pipe 50. The manifold is connected near the top of the storage tank 47 by a discharge pipe 51 through a valve 52. The storage tank has an automatic air-valve 53.

The selecting device comprises a small box 54 which is fastened to the instrument board 55 of the automobile, within the reach of the driver. This box has in its centre a gear-wheel 56 which is fastened to a hollow spindle 57 and a collar 58 by a pin 59 and is mounted to revolve in bearings 60 formed in the sides of the box 54.

The key 61 which operates the device is inserted into the hollow spindle 57 and its bifurcated end will straddle the pin 59 thereby causing the gear 56 to be rotated by the key. Behind the pin 59 in the hollow spindle 57 is a small spring compressed pin 62 projecting a short distance beyond same, its object to be explained later.

The gear wheel 56 in the box 54 is meshed into four small gears 63, mounted to revolve loosely on a short hollow shaft 64. This shaft revolves in bearings 65 formed in the box 54. At the outer end of the shaft, a gear wheel 66 is fastened, which meshes into another gear 67 at right angle thereto, which is fastened to the shaft 68, the object thereof to be explained later.

The hollow shaft 64 constitutes part of the clutch mechanism, and on the forward portion thereof is rotatively mounted a gear 63 which is always in mesh with the central gear 56. The gear 63 may be clutched to the hollow shaft or spindle 64 by pulling out the plunger 69, until the key 70 engages the slot 71 in the spindle 64. The plunger 69 is provided with a knob 70 whereby said plunger may be pushed in or pulled out thereby disengaging or engaging the gear 63. A key 70' is fastened to the plunger and extends on either side thereof and is made to slide in a slot 71 formed in the spindle 64. The plunger 69 has two half-round grooves 72 into which fits a small spring-compressed ball 73, for the purpose of locking said plunger in a predetermined position. The gear 63 has a groove 74 which registers with slot 71 in the spindle 64. As shown at the left hand side of Fig. 3, the gear 63 is unclutched from the spindle 64, whereas at the right hand side of the same figure, the plunger 69 is pulled out, thereby bringing the key 70 into engagement with the groove 74 of the gear 63 and consequently when the gear 56 is rotated by means of the key 61, it also turns the gear 63 and shaft 64, whereas at the left hand side, only the gear rotates idle.

The perpendicular shaft 68 at the back of the box 54 is mounted to rotate in bearings 75 attached thereto. The shaft 64 which connects the gear nearest to the box 54 is somewhat shorter than shaft 64a which connects the outer shaft 68 to the gears. At the lower end of the shaft is a suitable connection for the reception of the flexible shaft, 89 which at the other end thereof connects with the shaft 37 of the jack 18.

It is now evident, that if a certain plunger is pulled out, thereby engaging its clutch with its corresponding shaft and gear, and if the central gear is rotated, the jack may be swung into any desired position through the medium of the flexible shaft.

To the upper end of the shaft 68 is fastened a disc 76, carrying a pin 77, which engages a slot 78 in disc 79 which is fastened to the valve stem 80 of valve 81. This is best shown in Fig. 8. One side of the valve 81 is connected to the manifold 48 by a conduit 82, whereas the other side of said valve is connected to the jack 18 by a conduit 40. As shaft 68 is rotated, the pin 77 comes in contact with the slot 78, thereby causing disc 79 which is fastened to the valve stem 80 to rotate and cause the valve to open. If liquid is now supplied to the jack through the operation of the pump 46, the liquid will be drawn from the storage tank 47 and forced into the manifold 48, thence through the pipe line leading to this particular jack, expand the same and raise the corresponding wheel of the automobile from contact with the ground. On the reverse movement of the shaft, it will close the valve, leaving the jack expanded and the wheel elevated from the ground. Any selected jack may be operated in similar manner until all of the wheels of the automobile are elevated.

If it is desired to lift the whole automobile up bodily, it is only necessary to pull out all four plungers and proceed as above described.

The releasing mechanism is best shown in Fig. 12. Behind the centre of the selecting box 54 is fastened a spring-compressed valve 52. One side thereof connects to the manifold 48 by a pipe 85 and on the other side is connected to the storage tank 47 by a pipe line 51. It will be observed that the pressure from the manifold has a tendency to keep the valve 52 normally closed.

When it is desired to operate and place the jack in position for lifting the automobile, the key 61 is inserted into the hollow spindle 57 as shown by dotted lines, just far enough in, so as not to come in contact with the pin 62. When it is desired to release the jack, the key is pushed further in, until the cut-out portion 87 comes in contact with the pin 59. The key is then slightly turned to the left, until the pin 59 locks into the cut-out portions 87 of the key 61. The pin 62 has now pushed the valve stem 88 into the valve 52 and opened same.

The liquid is now forced, by the weight of the automobile back into the manifold thence through valve 83 and back into the storage tank. The remaining liquid in the jack is also forced into the tank by the reason of the spring located in the centre of the jack. After the jack is empty the key 61 is turned to the left, thereby moving the jack back into its locked position and at the same time closing the valve which controls the flow of liquid to the jack. The key is then removed and the spring compressed valve is closed.

It will thus be seen that when the automobile is travelling on the road, all the valves are closed and the fluid confined in the storage tank. It will now be seen that all the mechanism is hid behind the instrument board, only the face of the selecting box and the end of the pump-handle which projects slightly through a slot in the board, is visible. All connections for the flexible shafts and pipes terminate at the lower edge, back of the board so that easy access may be had in connecting or installing same.

I claim:

1. A hydraulic jack comprising a storage tank, a pump connected to the tank, a head suitable for fastening to a vehicle tubular telescopic members swingingly mounted by means of trunnions to the head, a conduit leading from the pump to the tubular members the fluid conduit being normally closed, a driving shaft connected to one of the trunnions, driving means, a clutch unit having a loosely mounted pinion connecting the driving means with a trunnion of the swingingly mounted members, means controlled by the operator for locking the loosely mounted pinion to the driving shaft to swing the tubular swingingly mounted members downward to open the fluid control valve, a valve communicating with the fluid conduit and the tank, and means controlled by the operator for actuating the valve to drain the fluid from the tubular members.

2. A hydraulic jack comprising a storage tank, a pump connected to the tank, a head suitable for fastening to a vehicle, tubular telescopic members swingingly mounted by means of trunnions to the head, a conduit leading from the pump to the tubular members the fluid conduit being normally closed, a driving shaft connected to one of the trunnions, driving means including a gear spindle for an operating key, a clutch unit having a loosely mounted pinion connecting the driving means with a trunnion of the swingingly mounted members, means controlled by the operator for locking the loosely mounted pinion to the driving shaft to swing the tubular swingingly mounted members downward to open the fluid control valve, a spring controlled valve communicating with the fluid conduit and the tank and means for locking the operating key in the gear spindle thereby actuating the valve to open the fluid conduit leading to the tank so as to drain the fluid from the tubular members.

3. A hydraulic jack comprising a storage tank, a pump connected to the tank, a head suitable for fastening to a vehicle, tubular telescopic members swingingly mounted by means of trunnions to the head, a conduit leading from the pump to the tubular members the fluid conduit being normally closed, a driving shaft connected to one of the trunnions, driving means, a clutch unit having a loosely mounted pinion connecting the driving means with a trunnion of the swingingly mounted members, means controlled by the operator for locking the loosely mounted pinion to the driving shaft to swing the tubular swingingly mounted members downward to open the fluid control valve, a valve connecting with the fluid conduit and the tank, and a sleeve with said driving means fastened thereto, a plunger for operating the valve, slidingly mounted in the sleeve, said plunger and valve being actuated by a key to open it thereby draining the fluid from the tubular members.

BARNEY GOLDMAN.